(12) United States Patent
Brask

(10) Patent No.: US 6,924,456 B2
(45) Date of Patent: Aug. 2, 2005

(54) METHOD AND APPARATUS FOR PARTICLE REMOVAL

(75) Inventor: Justin K. Brask, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/421,557

(22) Filed: Apr. 21, 2003

(65) Prior Publication Data

US 2004/0206732 A1 Oct. 21, 2004

(51) Int. Cl.$^7$ .............................................. B23K 26/00
(52) U.S. Cl. ............................. 219/121.68; 219/121.69
(58) Field of Search ....................... 219/121.68, 121.69; 134/1.3; 96/58

(56) References Cited

U.S. PATENT DOCUMENTS

| | | | | |
|---|---|---|---|---|
| 3,841,840 A | * | 10/1974 | Hundhausen et al. | 422/180 |
| 4,987,286 A | * | 1/1991 | Allen | 219/121.68 |
| 6,066,032 A | * | 5/2000 | Borden et al. | 451/80 |
| 6,217,422 B1 | * | 4/2001 | Franca et al. | 451/56 |
| 6,494,217 B2 | * | 12/2002 | Thompson et al. | 134/1.3 |
| 6,805,751 B2 | * | 10/2004 | Allen | 134/1 |
| 2002/0023902 A1 | * | 2/2002 | Allen | 219/121.66 |

FOREIGN PATENT DOCUMENTS

| | | | | | |
|---|---|---|---|---|---|
| JP | 53-108276 A | * | 9/1978 | | 219/121.68 |
| JP | 2000-202385 A | * | 7/2000 | | |
| JP | 2001-269636 A | * | 10/2001 | | |
| JP | 2002-35709 A | * | 2/2002 | | |
| JP | 2003-047923 A | * | 2/2003 | | |

\* cited by examiner

*Primary Examiner*—Geoffrey S. Evans
(74) *Attorney, Agent, or Firm*—Blakely, Sokoloff, Taylor & Zafman LLP

(57) ABSTRACT

Numerous embodiments of method and apparatus for particle removal are disclosed. Some embodiments include a laser source and a substrate with a surface, the substrate having a layer of liquid partially covering the top surface and at least one particle on the substrate surface, the laser source configured to deliver one or more laser pulses to the substrate surface proximate to the at least one particle at an angle of incidence that is acute with respect to the substrate surface.

15 Claims, 3 Drawing Sheets

METHOD AND APPARATUS FOR PARTICLE REMOVAL

BACKGROUND

During the fabrication of semiconductor devices such as integrated circuits (ICs) from semiconductor wafers, debris and residues may be produced from one or more fabrication processes performed on the wafer. These byproducts of fabrication may become transient particles on the surface of the devices being fabricated, and may render these devices semi or non-functional. In order to remove some of these transient particles, one or more wafer cleaning processes may be incorporated as part of the semiconductor device fabrication.

One particular type of wafer cleaning process is ultrasonic or megasonic cleaning. This particular type of cleaning process typically utilizes a liquid medium deposited on a wafer surface, which is subjected to mechanical pressure waves, typically in the form of ultrasonic or megasonic waves. These waves create cavitation and cavitation implosions in the liquid medium, which may cause particles to be dislodged from a wafer surface. However, this particular type of cleaning process may be limited in the size of debris particles that it may remove, and additionally, use of this process may result in damage to a wafer surface.

Laser cleaning is another cleaning process that may be used to remove particles of sizes smaller than those that may be removed by use of ultrasonic or megasonic cleaning, for example. Dry laser cleaning is one particular type of laser cleaning, wherein a laser beam is directed towards a dry wafer surface, typically directed towards transient particles on the surface of the wafer. If the laser is discharged into a transient particle, energy from the laser beam may be dissipated in the particle, causing the physical bond, or particle/wafer contact interface, to be broken. However, dry laser cleaning may be difficult to control, and may result in damage to a wafer surface if the laser is discharged into the wafer surface. A need, therefore, exists for a method and apparatus for particle removal, which addresses at least some of these limitations.

BRIEF DESCRIPTION OF THE DRAWINGS

The subject matter regarded as embodiments of the claimed subject matter is particularly pointed out and distinctly claimed in the concluding portion of the specification. Embodiments of the claimed subject matter, however, both as to organization and method of operation, together with objects, features, and advantages thereof, may best be understood by reference to the following detailed description when read with the accompanying drawings in which:

DETAILED DESCRIPTION

Embodiments of the claimed subject matter may comprise a method and apparatus for particle removal, wherein the particle removal may be performed on a semiconductor wafer as part of a semiconductor device fabrication process, for example. As mentioned previously, during fabrication of a device such as a semiconductor device, one or more fabrication processes may result in the production of debris and residues, which may result in transient particles being deposited on a wafer substrate. These transient particles may comprise etch residues, byproducts from gases used in one of the fabrication processes, or contaminants, for example, and may, for example, have a diameter of approximately 25–100 nanometers. Depending on the particular size of transient particles, one or more of these particles may render a resultant semiconductor device inoperative. For example, a semiconductor device based on 90 nanometer technology may be rendered inoperative if one or more transient particles with a diameter of 45 nanometers are deposited on the wafer surface.

Laser cleaning is one particular method of wafer cleaning that may be used to remove at least a portion of these transient particles. Laser cleaning is based upon the static or zeta potential, also referred to as the interface energy or physical bond, between a particle and the surface where the particle is deposited. Interface energy is relative to the inverse of the ratio of the diameter of the particle and the contact diameter of the particle on a surface. Dry laser cleaning is one type of laser cleaning which may direct a beam of laser light toward a wafer surface, which may be directed to a specific particle, for example. However, as described previously, not only is this particular type of laser clean very hard to control, but the laser may cause significant damage to the wafer surface if the beam is not discharged entirely in a transient particle, or if a particle is driven into the surface. Additionally, removal of particles may not be effective when using this method of cleaning, for example due in part to the angle of departure of a particle, use of this process may result in particles being moved from one location of the wafer surface to another. Laser steam cleaning is another method of cleaning a wafer surface which may incorporate dry laser cleaning technology, but uses a liquid interface on a wafer surface to at least partially reduce the damage that may result from dry laser cleaning, and may additionally allow removal of particles without the need to dissipate the laser energy entirely into the particle.

Figure 2:
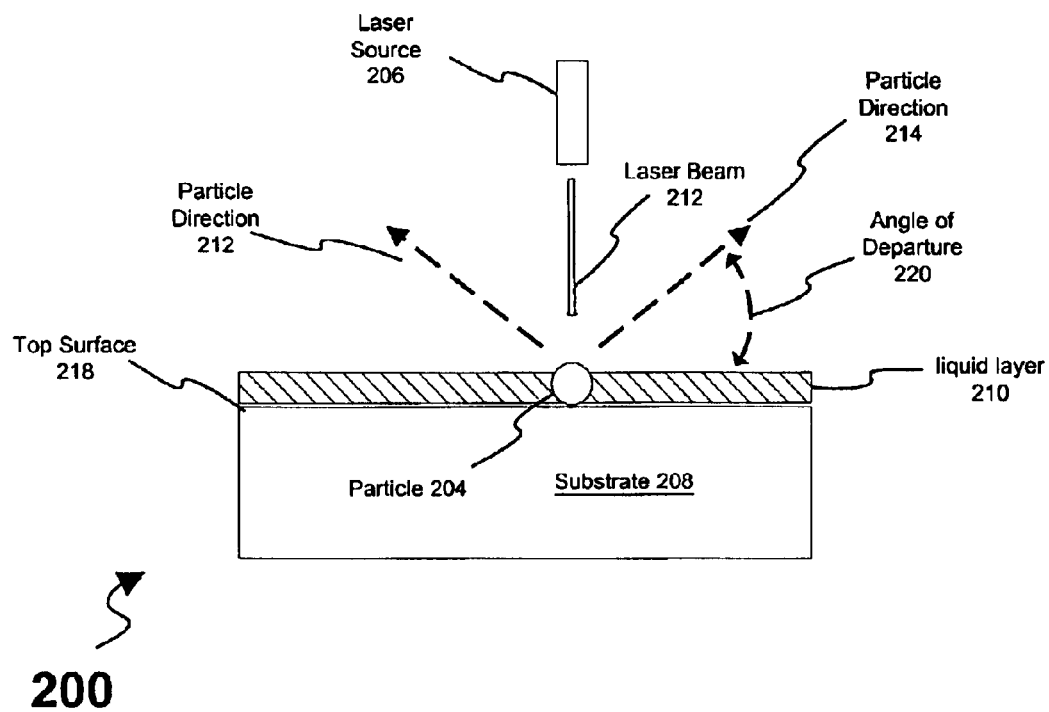
FIG. 2 is an illustration of one particular type of laser cleaning, as known in the art.

Referring now to FIG. 2, there is illustrated a wet laser cleaning apparatus, as known in the art. FIG. 2 illustrates a laser source 206, which may comprise a laser capable of producing a laser beam with a wavelength of 248–800 nanometers, for example. Laser source 206 is configured in an orthogonal position relative to the top surface 218 of substrate 208. Substrate 208 may comprise a semiconductor wafer such as a silicon wafer, for example. Shown contacting substrate 208 is particle 204, which may be a transient particle resulting from one or more fabrication processes, as described previously. A liquid layer 210, which may be a layer of water, is deposited on the top surface 218 of substrate 208. The laser may be used to remove the particle by producing a laser beam 212. In operation, laser beam 212 may contact particle 204, or may contact an area proximate to particle 204, and may cause energy to be dissipated in particle 204. This dissipation of laser energy may cause the interface energy between particle 204 and substrate 208 to be surpassed, causing the physical bond to be broken between particle 204 and substrate 208. Additionally, depending on the proximity of the laser beam with the particle, some of the energy from the laser beam may dissipate into the liquid, causing a phase change from liquid to vapor, for example. This will typically result in the particle moving from its position on substrate 208, such as a direction such as illustrated as particle direction 214, at a departure angle 220. However, this particular laser cleaning configuration may result in the particle moving from one location of substrate 208 to another, or may cause particle 204 to be driven into the substrate 208. Additionally, a laser configuration as illustrated may result in substantial damage to substrate 208 if the laser beam 212 misses or partially misses particle 204, and is discharged into the surface of substrate 208.

Embodiments of the claimed subject matter may comprise a method and apparatus for particle removal from a substrate. In one embodiment, an apparatus for particle removal comprises a laser source and a substrate with a surface, the substrate having a layer of liquid partially covering the surface and at least one particle on the substrate surface, the laser source configured to deliver one or more laser pulses to the substrate surface proximate to the at least one particle, at an angle of incidence that is acute with respect to the substrate surface.

It is worthy to note that any reference in the specification to "one embodiment" or "an embodiment" means that a particular feature, structure, or characteristic described in connection with the embodiment is included in at least one embodiment of the claimed subject matter. The appearances of the phrase "in one embodiment" in various places in the specification are not necessarily all referring to the same embodiment.

Numerous specific details may be set forth herein to provide a thorough understanding of the embodiments of the claimed subject matter. It will be understood by those skilled in the art, however, that the embodiments of the claimed subject matter may be practiced without these specific details. In other instances, well-known methods, procedures and components have not been described in detail so as not to obscure the embodiments of the claimed subject matter. It can be appreciated that the specific structural and functional details disclosed herein may be representative and do not necessarily limit the scope of the claimed subject matter.

Figure 1:
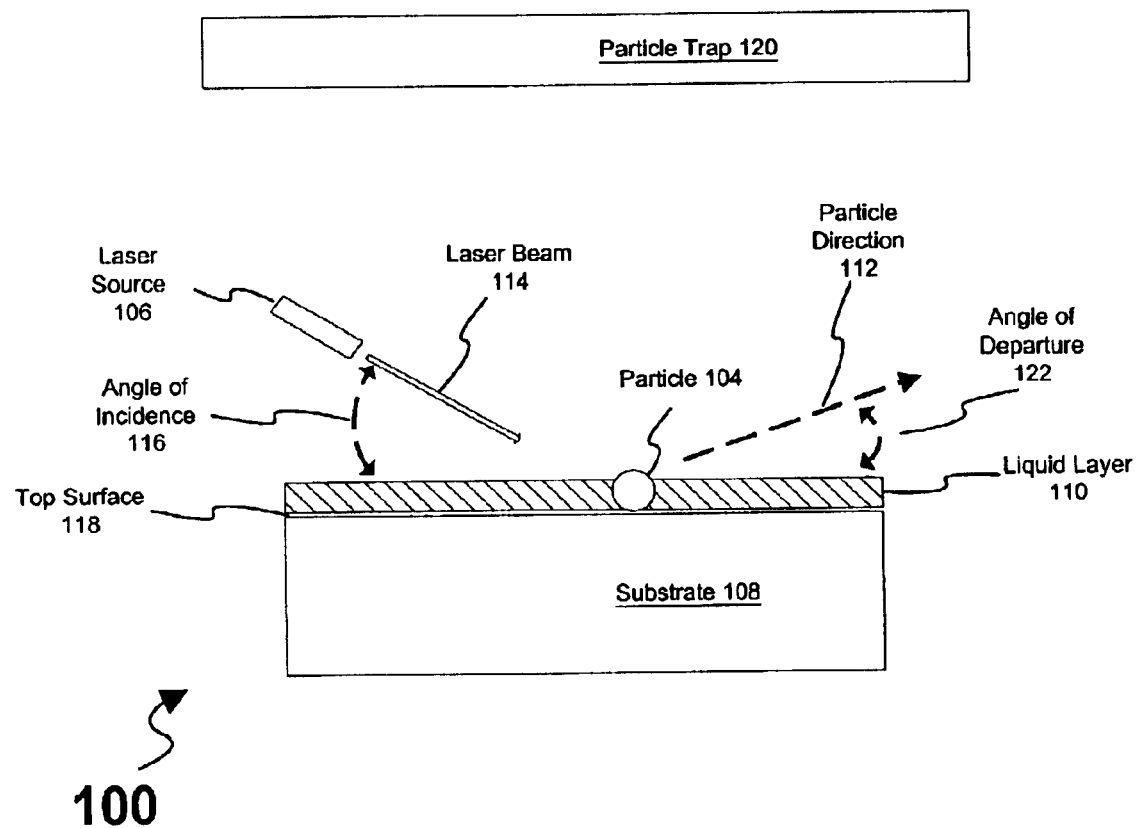
FIG. 1 is an illustration of one embodiment of the claimed subject matter.

Referring now in detail to the drawings wherein like parts are designated by like reference numerals throughout, there is illustrated in FIG. 1 an apparatus 100 for particle removal, and one particular method of using the apparatus. Apparatus 100 comprises a substrate 108, which may comprise a semiconductor device, although the claimed subject matter is not so limited. As described previously, devices such as semiconductor devices undergo several fabrication processes, which may result in the production of debris and/or residues, in the form of transient particles, on the surface of the device. These transient particles may render a device inoperative. Particle 104 is a representation of a transient particle on the surface of a device, which may result from fabrication, although those skilled in the art will be aware that a substrate may have a plurality of particles deposited thereon, and particles are not necessarily a relative size and shape as illustrated in FIG. 1. As shown in 100, the removal of particle 104 from the surface of substrate 108 may incorporate laser source 106, which may be configured to provide a laser beam 114 towards substrate 108, at an angle of incidence 116, wherein the laser beam may be discharged proximate to particle 104. Laser source 106 may be configured to deliver a laser beam at a particular angle of incidence 116 relative to substrate 108, and this angle may be acute in at least one embodiment. A liquid layer 110 may be deposited on the substrate 108, and liquid layer 110 may comprise a layer of water, in one embodiment. In one embodiment, a particle trap 120 may be configured above the surface of substrate 108, and may be configured to capture at least a portion of the particles removed from substrate 108.

In operation, laser source 106 may discharge, causing a laser beam 114 to strike proximate to particle 104. The laser beam may dissipate at least partially in the particle 104, which may cause energy to be dissipated in the particle greater than the particle/substrate interface energy. This may result in the physical bond being broken between particle 104 and substrate 108, causing particle 104 to be removed from the illustrated position on substrate 108. Additionally, depending on the proximity of the laser beam with the particle, some of the energy from the laser beam may dissipate into the liquid, causing a phase change from liquid to vapor, for example. Particle 104 may travel in a particle direction such as angle of departure 122, although this is just an example. In one embodiment, particle 104 may travel towards a particle trap 120. Shown above substrate 108 is particle trap 120. Particle trap 120 may be configured to trap at least a portion of the particles removed from the substrate 108, and may, for example, trap particles that travel in a direction such that they would fall back to the surface of substrate 108, for example. In one embodiment, particle trap is a foil trap, or similar type of electrically charged apparatus capable of utilizing electrical forces to trap one or more particles, for example.

In this embodiment, a laser source 106 is shown as a device configured to provide a laser beam 114 in the direction of substrate 108. However, it is important to note that any device capable of generating laser light may be used in at least one embodiment of the claimed subject matter. For example, a device with multiple laser generating sources may be used, and a plurality of laser beams may be provided proximate to the surface of substrate 108, or a laser may be used that is not configured to provide a laser beam in the direction of a substrate, but, rather, one or more mirrors (not shown) may cause the laser beam to contact a substrate at a particular angle of incidence, for example.

Figure 3:
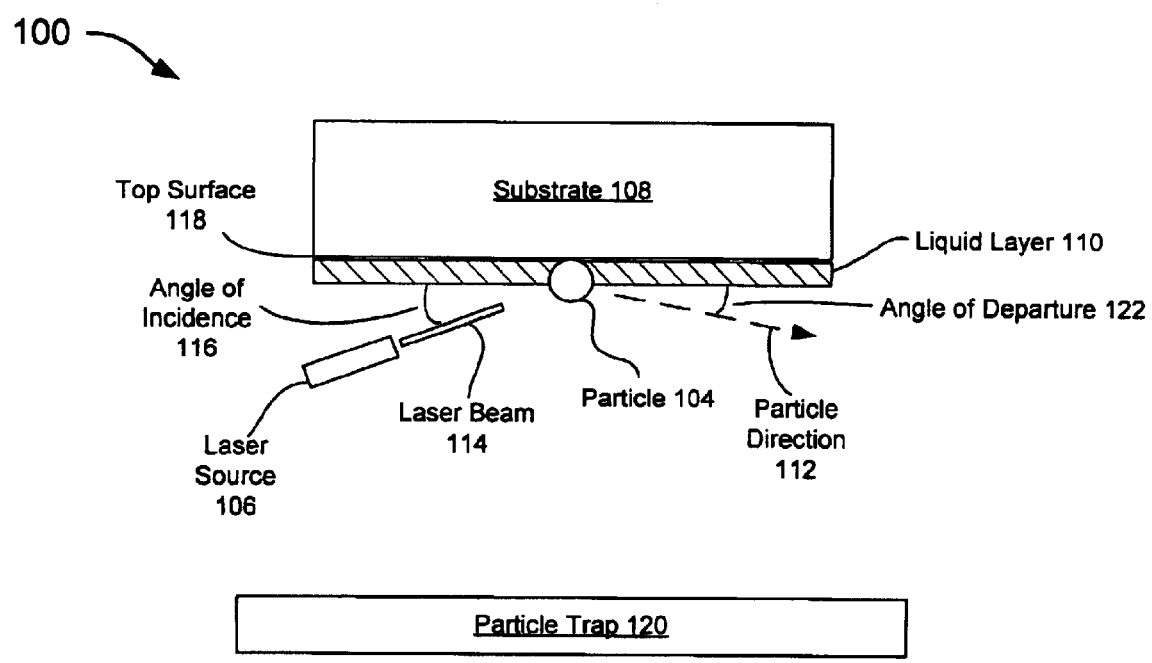
FIG. 3 is an illustration of one embodiment of the claimed subject matter.

In an alternative embodiment, apparatus 100 may be transposed, such that substrate 108 is reversed about the x-axis, as illustrated in FIG. 3. In this particular configuration, laser source 106 may be configured below substrate 108, and may perform in a manner similar to that described previously. In this particular configuration, a particle that is removed from substrate 108 may not return to the surface of the substrate due at least in part to gravitational forces. It is again important to note, however, that a laser may still be configured above substrate 108, and one or more mirrors or lenses may provide a laser beam at a particular angle of incidence towards one or more particles on substrate 108, for example.

In an exemplary embodiment, a method and apparatus for laser cleaning may comprise the following: a semiconductor substrate, wherein the semiconductor substrate has a top surface and one or more partially formed integrated circuit devices formed thereon. The semiconductor substrate additionally has one or more particles, such as transient particles, deposited thereon. The semiconductor substrate may have a layer of liquid deposited on at least a portion of the top surface, and this liquid may comprise deionized ultrapure water, for example. A laser source may be configured proximate to the substrate, and may be capable of delivering one or more laser beams at an angle acute with respect to the top surface of the substrate. In this embodiment, the angle of the laser beam relative to the top surface of the substrate may be between 5 and 45 degrees. In this embodiment, the laser may comprise a laser capable of producing a laser beam with a wavelength between 248 and 800 nanometers with pulses of 100 femtoseconds to 30 nanoseconds. The laser may produce a laser beam, and the beam energy may be dissipated at least partially in to one or more particles on the top surface of the substrate, or may be discharged entirely within one particle, for example. The dissipation of the laser beam energy into one or more particles may result in the physical bond between the substrate top surface and one or more of the particles to be broken, causing the particle to no longer be physically bonded to the substrate. Additionally, depending on the proximity of the laser beam with the particle, some of the energy from the laser beam may dissipate into the liquid, causing a phase change from liquid to vapor, for example. At least a portion of this process may be repeated if there is a plurality of particles on a substrate, for example, or if cleaning of a greater portion of the substrate surface is desirable. Additionally, several laser beams may be provided in a pattern such as a sweeping pattern, for example.

It can be appreciated that the embodiments may be applied to debris removal from a substrate. Certain features of the embodiments of the claimed subject matter have been illustrated as described herein, however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and remain in accordance with the claimed subject matter. It is, therefore, to be understood that the appended claims are intended to cover all such modifications and changes as fall within the true spirit of the embodiments of the claimed subject matter.

What is claimed is:

1. An apparatus for particle removal, comprising:
    a substrate, said substrate having a substantially downward facing surface having a layer of liquid at least partially covering said surface;
    a laser source to remove particles, said laser source being configured such that said laser source is capable of providing laser light to the surface of the substrate, wherein the laser light is provided at an acute angle relative to the surface of said substrate; and
    an electrically charged particle trap below said substrate surface.

2. The apparatus of claim 1, wherein said acute angle is an angle in the range of five and 45 degrees.

3. The apparatus of claim 1, wherein said surface comprises a top surface.

4. The apparatus of claim 1, further comprising one or more mirrors, said one or more mirrors configured to provide said laser light to a particular location on said substrate.

5. The apparatus of claim 1, wherein said layer of liquid substantially comprises water.

6. The apparatus of claim 1, wherein the laser source comprises a laser capable of delivering laser light within the wavelength range of 248 to 800 nanometers, and said laser source is configured to deliver laser light pulses with a duration within the range of 100 femtoseconds and 30 nanoseconds.

7. The apparatus of claim 1, wherein said substrate comprises a silicon wafer.

8. The apparatus of claim 1, further comprising at least one particle deposited on said substrate surface, wherein said particle is coupled to said substrate by interface energy, said laser being configured such that said laser light is capable of providing energy to said particle at a value greater than the interface energy of said particle.

9. A method for removing particles from a substrate surface, comprising:
    providing a layer of liquid on at least a portion of the substrate surface;
    directing said substrate surface substantially downward;
    providing one or more laser pulses to a point proximate to one or more particles,
    wherein said one or more laser pulses are provided at an angle of incidence acute with respect to the substrate surface; and
    providing an electrically charged particle trap to capture said particles.

10. The method of claim 9, the method further comprising utilizing one or more mirrors, said one or more mirrors configured to provide said laser light to a particular location on said substrate.

11. The method of claim 9, wherein said electrically charged particle trap comprises a foil trap.

12. The method of claim 9, wherein providing one or more laser pulses comprises providing one or more laser pulses at an angle of incidence in the range of five and 45 degrees.

13. The method of claim 9, wherein the layer of liquid substantially comprises water.

14. The method of claim 9, wherein providing one or more laser pulses comprises providing one or more laser pulses from a laser source, wherein said laser source comprises a laser capable of delivering laser light within the wavelength range of 248 to 800 nanometers, and said laser source is configured to deliver laser light pulses with a duration within the range of 100 femtoseconds and 30 nanoseconds.

15. The method of claim 9, wherein providing one or more laser pulses comprises providing one or more laser pulses capable of providing energy to one or more particles at a value greater than an interface energy of said particle.

* * * * *